United States Patent [19]

Moser et al.

[11] 4,213,519
[45] Jul. 22, 1980

[54] DISC BRAKE, ESPECIALLY FOR MOTOR VEHICLES

[75] Inventors: Gottfried Moser; Wilhelm Jansen, both of Bergisch Gladbach, Fed. Rep. of Germany

[73] Assignee: Klöckner-Humboldt-Deutz Aktiengesellschaft, Cologne, Fed. Rep. of Germany

[21] Appl. No.: 867,766

[22] Filed: Jan. 9, 1978

[30] Foreign Application Priority Data

Jan. 8, 1977 [DE] Fed. Rep. of Germany ....... 2700669

[51] Int. Cl.² .......................................... F16D 55/04
[52] U.S. Cl. ..................................... 188/71.4; 192/70
[58] Field of Search ............... 188/71.1, 71.4, 72.1, 188/72.3, 72.5, 72.7, 106 F; 192/70, 83, 85 AB, 93 A

[56] References Cited

U.S. PATENT DOCUMENTS

| | | | |
|---|---|---|---|
| 2,595,859 | 5/1952 | Lambert et al. | 188/72.5 |
| 2,732,036 | 1/1956 | Myers | 188/72.3 |
| 3,239,033 | 3/1966 | Walke | 192/70 |
| 3,543,886 | 12/1970 | Campbell | 192/70 |

FOREIGN PATENT DOCUMENTS

| | | | |
|---|---|---|---|
| 1937770 | 2/1971 | Fed. Rep. of Germany | 188/71.4 |
| 2049822 | 4/1972 | Fed. Rep. of Germany | 188/71.4 |
| 2636047 | 2/1978 | Fed. Rep. of Germany | 188/71.4 |
| 2638145 | 3/1978 | Fed. Rep. of Germany | 188/71.4 |

Primary Examiner—Edward R. Kazenske
Attorney, Agent, or Firm—Becker & Becker, Inc.

[57] ABSTRACT

A disc brake, especially for motor vehicles, which preferably has two pressure discs which by means of anti-friction or sliding bodies arranged in recesses provided with inclined or crowned surfaces rest against each other. When turning the pressure discs in counter-current direction with regard to each other, the anti-friction or sliding bodies move onto the surfaces of the recesses, spread apart the pressure discs against the thrust of return springs, and press the brake discs, which are axially displaceable on a shaft to be braked, against associated braking surfaces. The pressure discs are guided in a housing by means of at least three guiding elements distributed over the circumference of the housing. Each pressure disc has associated therewith an abutment for limiting the turning movement of the pressure discs. The guiding members, which respectively resist a tilting of the pressure discs about the pertaining abutments, are radially adjustable. The radially adjustable guiding members are designed as guiding elements adjustable tangentially with regard to the pertaining pressure discs.

12 Claims, 4 Drawing Figures

DISC BRAKE, ESPECIALLY FOR MOTOR VEHICLES

SUMMARY OF THE INVENTION

The present invention relates to a disc brake, especially for motor vehicles, with preferably two pressure discs which by means of antifriction bodies or the like are held against each other, the antifriction bodies or the like being located in recesses or cutouts of the pressure discs which recesses or cutouts are provided with inclined or arched surfaces. When the pressure discs are turned in opposite direction with regard to each other by means of an actuating device, the antifriction and/or sliding bodies will move onto the surfaces of the cutouts, will spread the pressure discs apart against the thrust of return springs and will press the brake discs, which are axially displaceable on a shaft to be braked, against associated brake surfaces. The pressure discs are guided in a housing by at least three guiding members distributed over the circumference. Each pressure disc has associated therewith an abutment or the like for limiting its rotary movement, and the guiding members which counteract a tilting movement of a pressure disc about the abutment limiting its rotary movement are radially adjustable.

Disc brakes of the above described type are characterized in that the very thick film of rust which forms due to the wear of the brake discs can no longer cause a jamming because it is safely automatically removed from the radial bearings by the superimposed radial adjustment of the guiding members which occurs in view of the rotation of the pressure discs relative to each other. Furthermore the disc brakes of the above described type are also characterized in that the means for adjustment of the radially adjustable guiding members may simultaneously be used as adjustable resilient abutment for the two pressure discs so that also the noise which occurs with disc brakes of the above described type when changing the direction of rotation may be eliminated together with a following frequent jamming due to an incorrectly adjusted tangential play. However, it has been found that the adjusting means which according to the above described known arrangement are designed as adjusting eccentrics do not yet permit to optimize the mass production. Moreover, with the above described known design it has been found that the employed adjusting means would not form the most economical and space-saving intermediate member if these adjusting means were used as a direct transmitting element for the transmission of the braking forces introduced by a brake cylinder to an extension of the associated brake disc.

It is therefore an object of the present invention so to design a brake disc of the above described general character that the radially adjusting guiding means for the pressure discs will be suited particularly well for mass production and will offer the possibility of being employed as space saving intermediate member for a direct tangential transmission of braking forces from a brake cylinder to the radial extension of an associated pressure disc.

This object and other objects and advantages of the invention will appear more clearly from the following specification in connection with the accompanying drawings, in which:

FIG. 1 diagrammatically illustrates a section through a disc brake, said section being taken transverse to the shaft to be braked and showing one embodiment of the invention.

Figure 1:
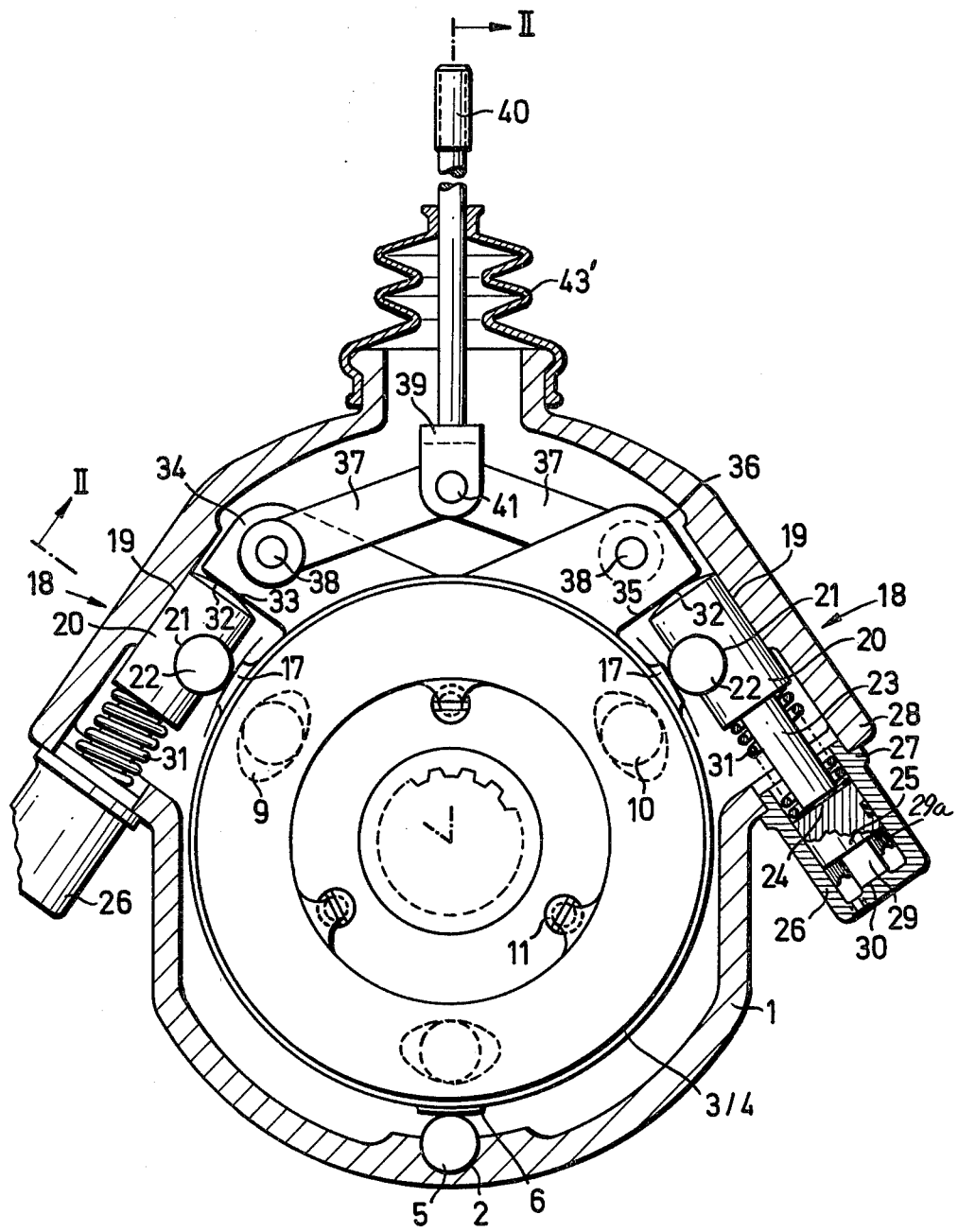

The disc brake according to the present invention is characterized primarily in that the radially adjustable guiding means are designed as guiding member which is adjustable tangentially with regard to the pertaining pressure disc. Such an arrangement brings about the advantage that, in view of the tangentially adjustable guiding members of the disc brake, the guiding members which absorb the centering forces of the pressure discs can be designed especially economically and also especially wear-free.

In this connection, a particularly favorable mass production can be realized due to the fact that the tangentially adjustable guiding member includes a guiding bolt which is guided in tangential guiding means and which comprises a support for a sliding and/or antifriction body for radially guiding the pertaining pressure disc. Furthermore this design is particularly favorable with regard to manufacture and costs due to the fact that the support for the guiding bolt is designed as an open transverse bore having associated therewith a roller for radially guiding the engaging pressure discs.

According to a further development of the invention it is provided that the guiding bolt is designed as an abutment limiting the rotary movement of the associated pressure disc. In this connection, for preventing brake shocks when reversing the driving direction, it is expedient that the guiding bolt is by means of a pressure spring directly or indirectly supported by the brake housing and by means of an end face, when the disc brake is disengaged, engages a radial extension of the pertaining pressure disc. A space saving and particularly operationally safe arrangement is realized due to the fact that the pressure spring is guided on a pivot-shaped portion of the guiding bolt. For simultaneously employing the tangentially adjustable guiding member as an abutment member and as an automatically self-adjusting abutment, it is suggested according to the invention that the guiding bolt is in both directions spring-loaded and that the springs acting upon the guiding bolt are preferably designed as multi-layer dish springs. In this connection it is expedient for the use of the guiding bolt as self-adjusting abutment that the pressure springs acting upon the guiding bolt are so adjusted relative to each other that the spring which urges the guiding bolt in braking direction in the direction of a rotation of the pertaining pressure disc is preloaded to a greater extent than the pressure spring urging the guiding bolt in the opposite direction.

A space-saving and also particularly economical design is realized for the guiding bolt and its supporting members when the springs acting upon the guiding bolt are arranged on both sides of a stationary collar through which extends a pivot-shaped portion of the guiding bolt, the collar being directly or indirectly connected to the brake housing. In this condition it is expedient that the pivot-shaped portion of the guiding bolt, which portion projects from the collar, and the springs arranged on the outside of the collar are covered by a cap or the like.

If the pressure discs, by means of a radial projection, rest upon the associated radially adjustable guiding member, it is suggested according to the invention that the radial projections which directly or indirectly rest against the tangential guiding member have a radius which increases in the direction of rotation of the pressure discs for effecting a braking action. In this way it will in particular be realized that, with a tangential displacement of the radial guiding member designed as antifriction or sliding body, there will always be maintained a constant play between the two pressure discs and the third stationary radial guiding member during a relative adjustment of the pressure discs to each other.

If the two brake discs are adjustable by a brake cylinder each and an intermediate member acting in braking direction through a radial extension of the brake discs, it is suggested according to a further development of the invention that the tangentially adjustable guiding member be designed as intermediate member between the associated brake cylinder and the radial extension of the associated brake disc. In this connection it is expedient that the piston of the brake cylinder forms a counter bearing for the pressure spring of the guiding bolt. For a cost-saving manufacturing process it is furthermore advantageous that the bottom of the piston of the brake cylinder forms a counter bearing for the guiding bolt.

Figure 2:
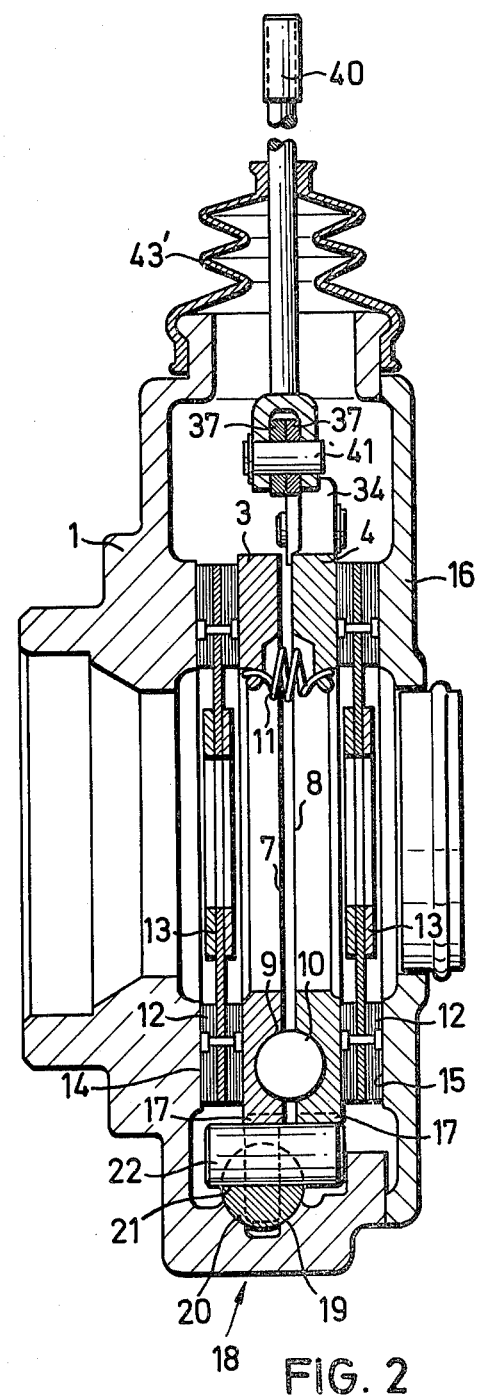
FIG. 2 represents a section taken along the line II—II through the disc brake of FIG. 1.

Referring now to the drawings in detail and FIGS. 1 and 2 thereof in particular, the disc brake shown therein comprises a brake housing 1 which by means of screws (not shown) is connected to a non-illustrated housing of a drive for a tractor. In the lower part of the brake housing 1 in a cylindrical support 2 there is mounted a cylindrical roller 5 which serves as radial guiding member for two pressure discs 3 and 4 which are adapted to be displaced relative to each other in a turning direction and in an axial direction. The two pressure discs 3 and 4 respectively rest upon the cylindrical roller 5 by means of radial projections 6. The pressure discs 3,4 are on those surfaces 7, 8 which face each other provided with recesses or cutouts 9 which preferably are pyramid-shaped and which, when the disc brake is disengaged, are located approximately opposite to each other, while between the cutouts 9 a ball 10 each is arranged. The pressure discs 3 and 4 are by means of tension springs 11 axially pulled toward each other. With their outer surfaces the two pressure discs 3 and 4 respectively act upon a respective brake disc 12 which by means of a follower member 13 are mounted on a non-illustrated brake shaft. Those lateral surfaces of the brake discs 12 which face away from the pressure discs 3 and 4 cooperate with a lateral braking surface 14 of the brake housing 1 or with a lateral braking surface 15 of a cover 16 which by means of non-illustrated screws is connected to the brake housing 1.

Those sections of the two pressure discs 3 and 4 which face away from the radial projections 6 are provided at the circumference with radial projections 17 for centering purposes. These lateral projections 17 include an angle of 120° or a smaller angle. The radial projections 17 respectively rest upon guiding members 18 in the brake housing 1, the guiding members 18 being arranged offset with regard to each other by the same angle and being radially adjustable by tangential displacement with regard to the pertaining pressure disc dependent upon relative disc rotation necessary for braking to adjust radial guidance to an effective inner radius defined by the guiding members. Each of the radially adjustable guiding members 18 is formed by a guiding bolt 20, which is tangentially adjustable, with each being guided in a preferably semicylindrical tangential guiding means 19, and by a roller 22 radially guided in an approximately semi-circular bore 21 of the guiding bolt 20 (FIG. 2).

The guiding bolts 20 rest by means of a stud-shaped part 23 on the bottom 24 of a piston 25 for adjustment of the pressure discs 3 and 4. The pistons 25 are respectively guided in brake cylinders 26 which are connected to a non-illustrated brake conduit and which by means of a flange 27 are connected to an associated receiving surface 28 of the brake housing 1. Each piston 25 of the brake cylinders 26 is provided with a stud 29 carrying the radial seal 29a. The stud 29 rests on an abutment 30 of the brake cylinder 26. Between each guiding bolt 20 and the associated piston 25 there is arranged a pressure spring 31 each which surrounds the stud-shaped part 23. The pressure springs 31 are preferably so designed that each associated guiding bolt 20 with its end face 32, which faces away from the bottom 24 and which is preferably crowned, always rests against the oppositely located end face 33 of a radial extension 34 of the pressure disc 3 or against the oppositely located end face 35 of a lateral extension 36 of the pressure disc 4.

For adjusting the two pressure discs 3, 4 by means of a non-illustrated manually operable or foot operable brake lever, the extension 34 is, similar to the extension 36, coupled to a link 37 by means of a bolt 38. The two links 37 are with the fork-shaped part 39 of a pull bolt 40 connected to each other by means of a bolt 41. The pull bolt 40 is surrounded in part by a bellows 43'.

The guiding bolts 20 and the members for supporting the same, namely the stud-shaped parts 23 and the pistons 24 as well as the brake cylinders 26 and the receiving surfaces 28, are so designed that in the illustrated disengaged position of the disc brake the two rollers 22 occupy a position in which their radial distance from the center of the disc brake is the shortest. In the brake housing there are respectively provided associated webs for transversely guiding the rollers 22.

The operation of the disc brake according to FIGS. 1 and 2 is as follows:

If for carrying out a braking action the two brake cylinders 26 are subjected to a pressure medium, the pressure discs 3, 4 are, by the two pistons 25 through the intervention of the tangential guiding bolts 20, by means of their radial extensions 34, 36 turned relative to each other. As a result thereof, through the intervention of the balls 10 in cooperation with the pyramid-shaped cutouts 9, the two pressure discs 3, 4 are spread apart and by means of these pressure discs 3, 4 the brake discs 12 are brought into contact with the associated or cooperating braking surfaces 14, 15 and are held in this position. Simultaneously with the rotation of the two pressure discs 3 and 4 the radius for centering the two arc-shaped projections 17 is increased by the tangential displacement of the rollers 22. As a result thereof a jamming of the two pressure disc 3, 4 with the roller 5 for guiding the same and with the rollers 22 is practically made impossible. The same effect of the tangentially adjustable guiding members 18 in cooperation with the radial projection 17 of the two pressure discs 3, 4 as well as their extensions 34, 36 is obtained when adjusting the two pressure discs 3, 4 by the pull bolt 40 by means of the two links 37. In both instances it is furthermore assured by the two pressure springs 31 that during a rotation of the two pressure discs 3, 4 relative to each other by means of their extensions 34, 36 the guiding bolts 20 will in a play-free manner engage the end faces 33, 35 through the intervention of their extension 34, 36 and at the same time will cause the rollers 22 in a play-free manner to engage the radial projections 17.

Figure 3:
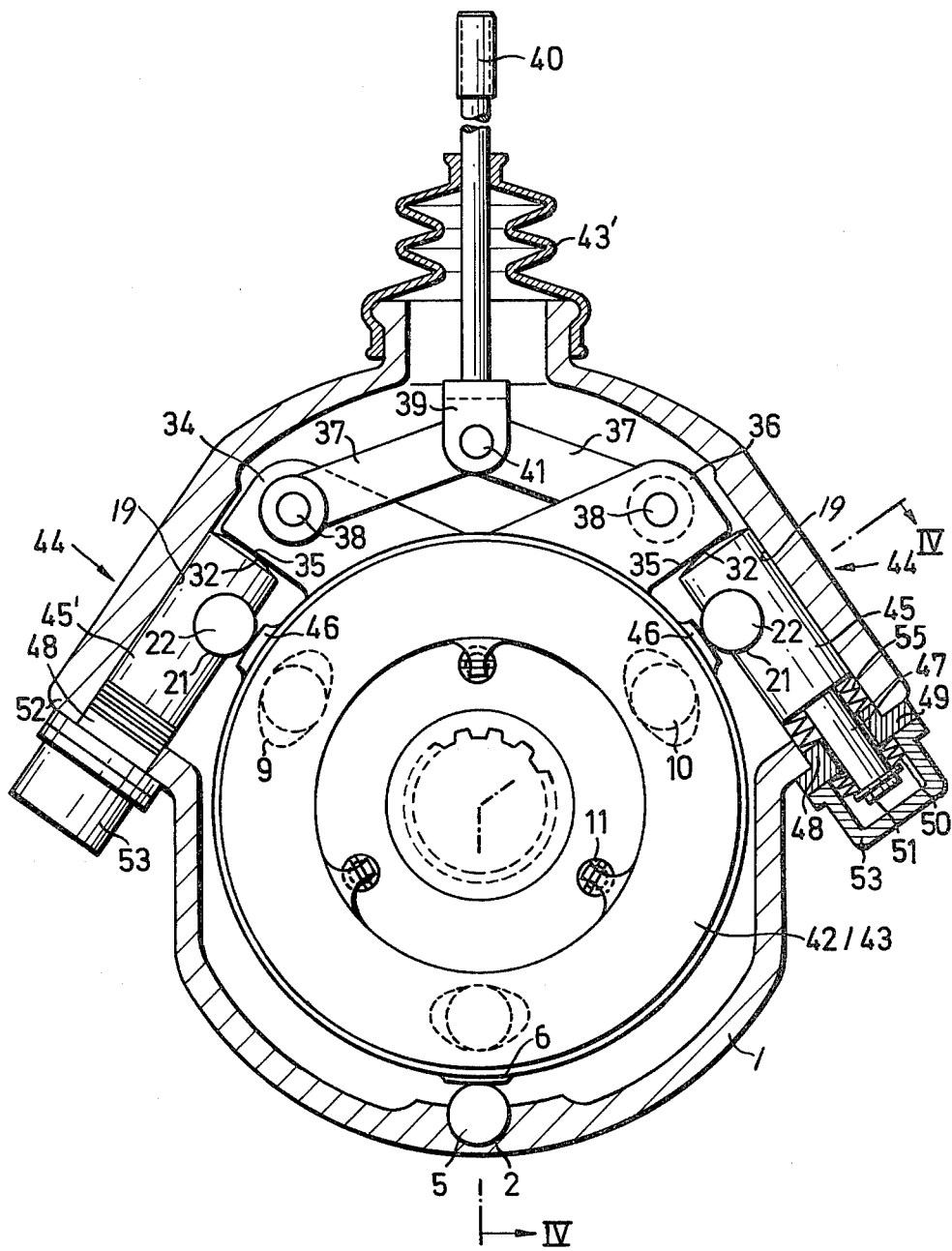
FIG. 3 illustrates a modification of the disc brake of FIG. 1.
Figure 4:
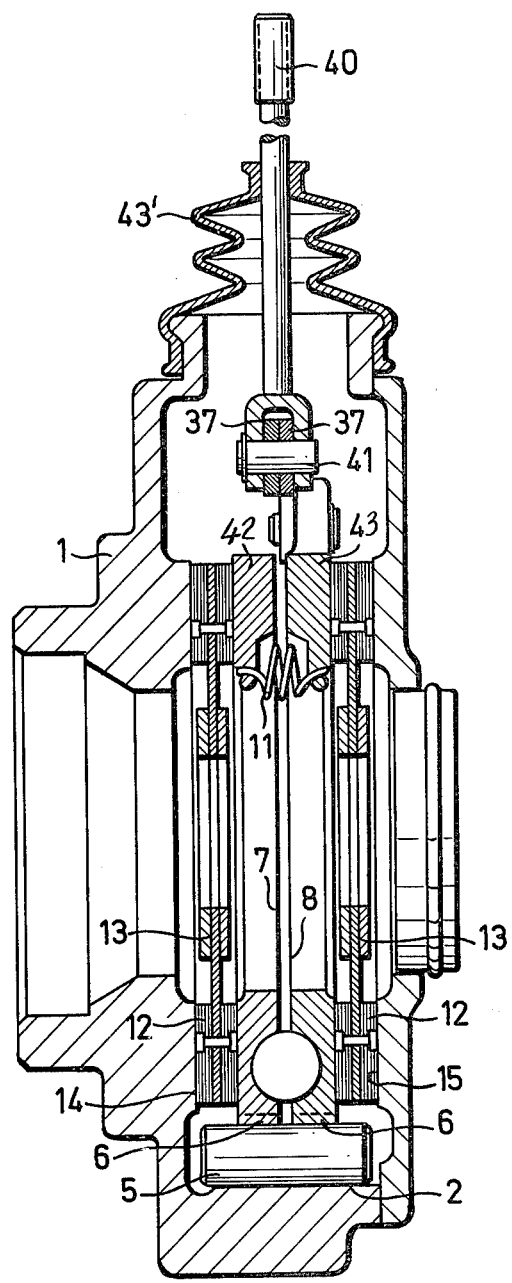
FIG. 4 is a section taken along the line IV—IV of FIG. 3.

Referring now to the embodiment of FIGS. 3 and 4, the two pressure discs 42 and 43, in contrast to the embodiment of FIGS. 1 and 2, are mechanically only by means of a pull bolt 40 rotated relative to each other respectively by associated links 37 and by extensions 34 and 36 respectively coupled to the links. For guiding the two pressure discs 42, 43, there are provided tangentially and radially adjustable guiding members 44 which consist of a guiding bolt 45' and an associated roller 22. The guiding bolts 45' are likewise guided in a tangential guiding member 19 of the brake housing 1. Furthermore, the two pressure discs 42, 43 are, in contrast to the embodiment of FIGS. 1 and 2, centered by means of radial projections 46 in their upper portion relative to the guiding members 44. The radial projections are provided with a radius the length of which increases in conformity with the magnitude of the rotation of the pressure discs in the direction opposite to the braking direction, the radius respectively being of such length that in a partial braking position of the two pressure discs 42, 43 with regard to each other as well as in the maximum possible braking position of the two pressure discs with almost worn-off lining of the two brake discs 12 always the same predetermined play will result between the lower radial projection 6 and the associated roller 5. The two guiding bolts 45' are likewise provided with a stud-shaped part 47 which extends through a collar 48 of a flange 49. On both sides of the collar 48 dish springs 50,55 are guided on the stud-shaped part 47 under axial preload. The axial arresting of the guiding bolt 45' relative to the collar 48 is effected by a spring ring 51 which is arranged in a groove of the stud-shaped part 47. For protection against the influence of dust, each of the radially adjustable guiding members 44 has associated therewith a cover 53 which is connected to the flange 49 and an associated receiving surface 52 by means of non-illustrated screws.

The operation of the radially adjustable guiding members 44 of the disc brake of FIGS. 3 and 4 is as follows:

If by means of the pull bolt 40 and the links 37 coupled thereto the two pressure discs 42, 43 are turned relative to each other by means of their radial extensions 34, 36, the dish springs 50,55 arranged between the collar 48 and the guiding bolt 45' will, in view of the different forces acting thereupon, tangentially adjust the guiding bolts 45' up to a predetermined value proportional to the turning of the two pressure discs in the direction of rotation thereof. During this rotation and during a following stronger rotation for effecting a complete braking action, the two pressure discs 42 and 43 will, by means of their radial projections 46, always engage the rollers 22 in a play-free manner, while between the roller 5 and the radial projection 6 a predetermined play occurs. As soon as during a braking operation a predetermined braking moment is exceeded, the respective guiding bolt 45' which absorbs the moment of the pressure discs 42, 43 in the direction of rotation is displaced against the thrust of the dish springs 50 which are located between the guiding bolt 45' and the collar 48, whereas the other one of the two guiding bolts 45' by means of the dish springs 50 will after a tangential adjustment retain its predetermined position. Since the guiding bolts 45' act as resilient abutments, a jamming of the two pressure discs 42, 43 during a braking operation in the positive direction of rotation will be safely prevented. Furthermore, it will also be realized that after a subsequent rotation of the pressure discs 42, 43 in the opposite direction in view of a reversal of the driving direction, the supporting moment resiliently absorbed by the guiding bolt 20 (FIG. 2) will render a jamming of the pressure discs 42, 43 in their radial guiding members 5, 22 practically impossible.

It is of course to be understood that the present invention is, by no means, limited to the specific showing in the drawings but also comprises any modifications within the scope of the appended claims.

Thus, for instance, instead of a cylindrical guiding bolt 20, 45' for guiding the two pressure discs 3, 4 and 42, 43, it is also possible to provide within the region of the radial projections in the same manner a guiding body with a sliding block which is not designed as roller body 22 while the guiding body is transversely guided in a guiding bolt of rectangular or triangular cross section.

Furthermore, it is also possible, instead of the radial projections 17, to provide the pressure discs 3, 4 according to the embodiment of FIGS. 1 and 2 with radial extensions 46 according to the embodiment of FIGS. 3 and 4 while these radial extensions have a radius which increases correspondingly in the direction of rotation of braking.

What I claim is:

1. A disc brake, especially for motor vehicles, which includes: a brake housing, a pair of pressure disc means arranged in said braking housing, actuating means associated with said pressure disc means for turning said pressure disc means angularly in opposite directions with regard to each other for pressing a rotatable brake disc on each side of said pressure disc means against associated braking surfaces, each pressure disc means having at least three projections distributed over the circumference of said pressure disc means for guiding said pressure disc means, guiding means respectively associated with at least some of said projections and including a guiding member adjustable tangentially with regard to the pertaining pressure disc means, an abutment means respectively associated with said pressure disc means for limiting turning movement thereof, each of said tangentially adjustable guiding members includes a guiding bolt with a bearing surface, and a bearing member nested in said bearing surface and engaging the pertaining projection, said bearing member being a roller body, and said bearing surface being shaped in conformity with the contour of the outer surface of said roller body and only partially surrounding said roller body so that a portion of the latter protrudes from said guiding bolt and engages the pertaining projection.

2. A disc brake according to claim 1, in which said guiding bolt forms said abutment means.

3. A disc brake, especially for motor vehicles, which includes: a brake housing, a pair of pressure disc means arranged in said braking housing, actuating means associated with said pressure disc means for turning said pressure disc means angularly in opposite directions with regard to each other for pressing a rotatable brake disc on each side of said pressure disc means against associated braking surfaces, each pressure disc means having at least three projections distributed over the circumference of said pressure disc means for guiding said pressure disc means, guiding means respectively associated with at least some of said projections and including a guiding member adjustable tangentially with regard to the pertaining disc means, and abutment means respectively associated with said pressure disc means for limiting the turning movement thereof, each of said tangentially adjustable guiding members including a guiding bolt with a bearing surface, and a bearing member nested in said bearing surface and engaging the pertaining projection, each of said pressure disc means having an outwardly extending arm and each of said guiding bolts having associated therewith at least one spring means holding the pertaining guiding bolt in engagement with said arm when said disc brake is in its released position.

4. A disc brake according to claim 3, in which each of said guiding bolts comprises an axial extension and said spring means surrounding said axial extension.

5. A disc brake according to claim 4, in which each of said guiding members has associated therewith a fluid operable brake cylinder piston unit, and in which each of said guiding members is located between said brake cylinder piston unit and the respective adjacent outwardly extending arm.

6. A disc brake according to claim 5 in which a piston of each brake cylinder piston unit forms a counter bearing for one end of the spring means surrounding said extension while the other end of said last mentioned spring means bears against said guiding bolt.

7. A disc brake according to claim 6, in which the piston has a bottom serving as a counter bearing for said guiding bolt.

8. A disc brake according to claim 3, in which said guiding bolts are spring loaded in opposite directions by said spring means.

9. A disc brake according to claim 8, in which said spring means acting upon the respective guiding bolt are so selected with regard to their thrust that the spring means urging the pertaining pressure disc means to rotate in a braking direction is under a greater pre-load than the spring means urging the last mentioned pressure disc means to turn in the opposite direction.

10. A disc brake according to claim 8, in which each said spring means comprises two springs which are separated from each other by a stationary member, and in which each guiding bolt has connected thereto an extension extending through said stationary member and surrounded by the two pertaining springs.

11. A disc brake according to claim 10, which includes cover means covering up toward the outside that end portion of said extension which is remote from said guiding bolt and also covers up the spring surrounding said last mentioned end portion.

12. A disc brake according to claim 3, in which said projections have a radial outer surface with a radius increasing in the direction of rotation of said pressure disc means.

* * * * *